Dec. 9, 1969 U. ROTHGORDT 3,483,566

ELECTROGRAPHICAL PRINTING OR RECORDING DEVICES WHICH EMPLOY COINCIDENT CURRENT DRIVE OF THE PRINT ELECTRODES

Filed Sept. 16, 1965 2 Sheets-Sheet 1

INVENTOR.
ULF ROTHGORDT

BY

[signature]

AGENT

INVENTOR.
ULF ROTHGORDT
BY
Frank R. Jufau
AGENT

United States Patent Office 3,483,566

Patented Dec. 9, 1969

3,483,566

ELECTROGRAPHICAL PRINTING OR RECORDING DEVICES WHICH EMPLOY COINCIDENT CURRENT DRIVE OF THE PRINT ELECTRODES

Ulf Rothgordt, Hamburg-Fuhlsbuttel, Germany, assignor, by mesne assignments, to U.S. Philips Corporation, New York, N.Y., a corporation of Delaware Filed Sept. 16, 1965, Ser. No. 487,767

Claims priority, application Germany, Sept. 17, 1964, P 35,086

Int. Cl. G01d 15/06

U.S. Cl. 346—74 15 Claims

ABSTRACT OF THE DISCLOSURE

An electrographic printing or recording device in which an electric charge is transferred to a record medium only upon the coincident application of two high level voltages across the print electrodes.

This invention relates to recording devices and more particularly to an improved electrographic printing or recording device. Electrographic printing and recording devices usually comprise two electrode sets between which a narrow gap is left to receive a printing or recording surface. In general, the two sets of electrodes are not constructed in the same manner. One set usually comprises a number of electrodes that separately receive a voltage. This set will hereinafter be termed, for the sake of simplicity, the printing head, whereas the separate electrodes of this set will be termed the printing electrodes. The other set, which often comprises only a single electrode of a larger surface, will be termed the counter-electrode.

The invention relates to an electrographic printing or recording device in which a surface element of a printing surface or record carrier is charged by electrically charged particles emanating from a spontaneous gas discharge produced in the electric field between a printing electrode and the record carrier. In general, a printing device of this type comprises a plurality of printing electrodes. If the printing electrodes are formed by pins, they may be arrayed in rows or columns, or in the form of a matrix. The latent charge configuration obtainable with the aid of such a device, if necessary in combination with a movement of the printing or recording surface, is formed by a dot raster which may have any content. In this case the sharpness or definition of the image is determined by the distance between the separate pin electrodes. This device is particularly suitable for printing signs in the form of characters and ciphers. In order to obtain a charge image according to a predetermined pattern, it is necessary for each printing electrode to be separately controllable so that each printing electrode must be associated with an individual electronic high-voltage switch. Therefore, in the case of a fairly great number of printing electrodes, the number of required switching means is considerable. This number can be reduced by using devices for coincidence operation, which means that the choice of a given printing electrode is determined by two settings of differently arrayed groups. Printing heads are known in which each printing electrode is accompanied by an auxiliary electrode. In these known devices a given printing electrode becomes operative only when an electric voltage is applied simultaneously to this printing electrode and to the associated auxiliary electrode, so that between these two electrodes a spontaneous gas discharge is initiated which produces a dot-shaped charge on the record carrier at the place of the excited electrode pair. The disadvantage of such a device resides in the gradual wear of the pair of printing electrodes and auxiliary electrodes and of the intermediate insulating material due to the constant production of sparks.

The electrographic printing or recording device according to the invention is characterized in that a printing electrode is connected through at least two electric dipoles to different high-voltage switches and, when all the high-voltage switches connected to such a printing electrode are switched on, the electric field between the printing electrode and the counter-electrode exceeds a threshold value required to produce a spontaneous gas discharge between th printing electrode and the printing or recording surface. However, when only some of the high-voltage switches connected to said printing electrode are switched on, the field remains below said threshold value.

The advantage of the device according to the invention, as compared with the aforesaid known device comprising printing electrodes, each accompanied by an auxiliary electrode, consists in that during the discharge between the metallic printing electrode and the insulating printing or recording surface, in contrast to the spontaneous discharge between two metallic electrodes, no visible discharge can be produced and no wear of the electrodes due to the discharge can occur, since the transferred energy is very slight, i.e. about $10^{-8}$ w./sec.

The invention will be described with reference to the drawing, which shows several embodiments of the invention for controlling the printing electrodes.

Before the coincidence effect according to the invention will be explained more fully, first the phenomena involved in the transfer of the electric charge from a single printing electrode to the printing or recording surface will be described briefly.

It may be assumed that a small accurately defined air gap of, for example, 20 $\mu$m. is left between the printing electrode and the printing or recording surface. This surface may consist in known manner of a thin insulating film, the rear side of which is provided with a coating or a carrier material of a given conductivity, for example, paper. The rear side of the printing or recording surface carrier is furthermore in good electrical contact with the counter-electrode. If an electric voltage prevails between a given printing electrode and the counter-electrode, nothing will occur at low values of said voltage with respect to the transfer of charge. Only at a given value of this voltage dependent upon the size of the air gap and upon the thickness of the film a spontaneous gas discharge is produced, so that the printing or recording surface opposite the printing electrode, corresponding to the diameter of said electrode, is charged. The threshold value of the voltage is usually designated the ignition voltage. It is therefore possible to apply an electric voltage up to a given value between the printing electrode and the counter-electrode and to produce an electric field between the printing electrode and the printing or recording surface without said surface being charged. In coincidence operation this effect is utilized by forming, with a fixed potential at the counter-electrode, the potential of a printing electrode by the addition of two or more potentials.

Figure 1:
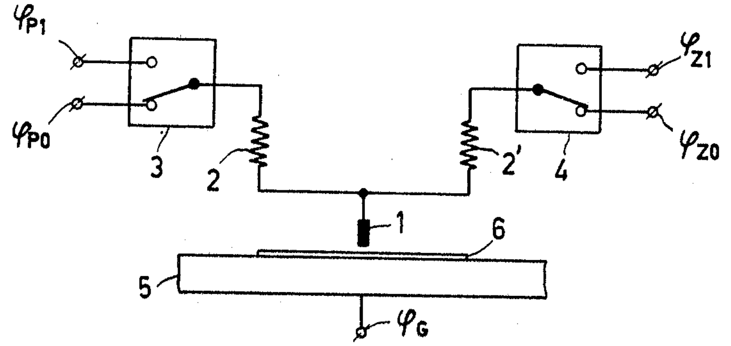
FIG. 1 shows the control of a printing electrode in which the dipoles are formed by ohmic resistors.

The principle of the operation of the device according to the invention will now be explained with reference to a single printing electrode, as shown in FIG. 1. The printing electrode 1 is connected through the resistors 2 and 2' to the high-voltage switches 3 and 4. These high-voltage switches may be formed in known manner by vacuum tubes, transistors, thyristors or similar electronic elements. The function thereof may be described most simply with reference to a switch shown in FIG. 1 as a mechanical commutator. In this embodiment it is possible to change over between two potential values, designated for the switch 3 by $\varphi_{P_0}$ and $\varphi_{P_1}$ and for the switch 4 by $\varphi_{Z_0}$ and $\varphi_{Z_1}$. The index 1 designates the switched-on condition of the switch. The potential $\varphi_D$ at the printing electrode 1 is then determined by the ratio between the resistors 2 and 2' and by the potentials $\varphi_P$ and $\varphi_Z$ passed by the switches 3 and 4, respectively. If, for example, the resistors 2 and 2' have equal values, then:

$$\varphi_D=\frac{\varphi_P+\varphi_Z}{2}$$

Opposite the printing electrode 1 there is a counter-electrode 5 having a fixed potential $\varphi_G$. A printing or recording surface 6 is provided on said counter-electrode. In the following description with reference to FIGS. 1 to 3 it is at first assumed that the potentials $\varphi_{P_0}$, $\varphi_{Z_0}$ and $\varphi_G$ are equal to zero. This simplifies the explanation of the operation. It is the electric voltage U between the printing electrode 1 and the counter-electrode 5 which actuates the discharge mechanism. If a charge has to be transferred from the printing electrode 1 to the printing or recording surface 6, U must exceed the aforesaid ignition voltage, designated by $U_i$. If both $\varphi_{P_1}$ and $\varphi_{Z_1}$ are chosen to exceed $U_i$, on the condition, however, that:

$$\frac{\varphi_{P_1}}{2}<U_i \text{ and } \frac{\varphi_{Z_1}}{2}<U_i$$

the voltage between the printing electrode 1 and the counter-electrode 5 will exceed the threshold value for initiating a spontaneous gas discharge when the two switches 3 and 4 are switched on (passage of $\varphi_{P_1}$ and $\varphi_{Z_1}$ respectively), but if only one of the switches 3 or 4 is switched on, said voltage will remain below the threshold value, so that only in the first case is the printing or recording surface charged.

Figure 2:
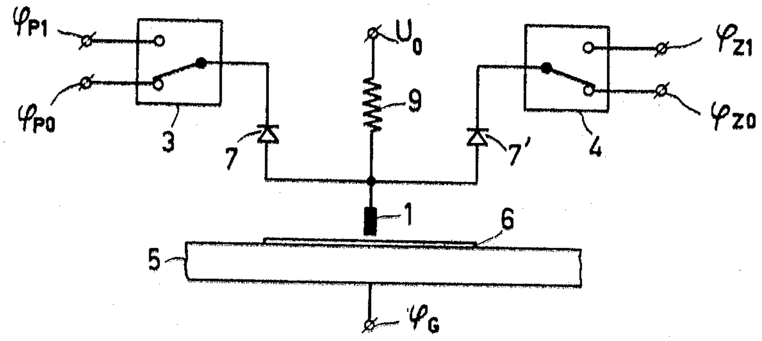
FIG. 2 shows a similar control in which diodes are employed.

FIG. 2 shows a further arrangement. The printing electrode 1 is connected through each of the diodes 7 and 7' to the two high-voltage switches 3 and 4 of FIG. 1 and moreover through a resistor 9 to a voltage source of voltage $U_0$, in which the same as indicated for $\varphi_{P_1}$ and $\varphi_{Z_1}$ applies to $U_0$. The diodes are polarised so that a current from the voltage source $U_0$ can flow through the resistor 9 and the diodes 7, 7' to the switches 3 and 4, provided one or both switches respectively are cut off. Across the resistor 9 this current produces a voltage drop such that, with respect to the counter-electrode 5, the printing electrode 1 is substantially at a voltage of 0 volt. However, when the two switches are switched on, the potential at the printing electrode 1 increases up to the lower of the values of $U_0$, $\varphi_{Z_1}$ or $\varphi_{P_1}$, so that a voltage exceeding the ignition voltage $U_i$ is produced between the counter-electrode and the printing electrode. The printing or recording surface is thus charged.

Figure 3:
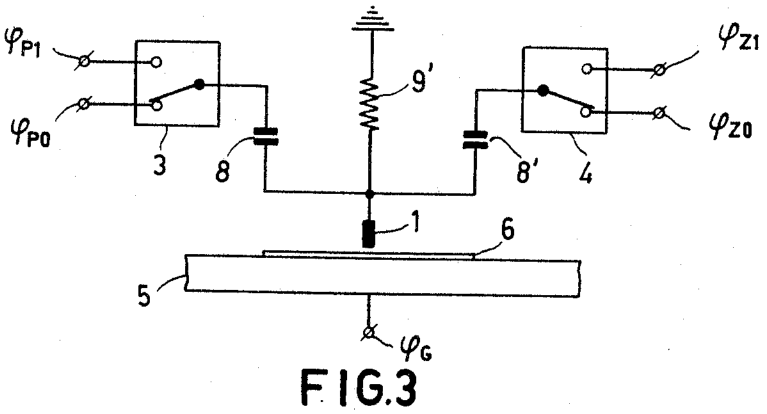
FIG. 3 shows a control in which capacitors and resistors are used.

FIG. 3 shows an arrangement in which the voltage is applied to the electrode 1 through two identical capacitors 8, 8', connected to the electrode 1, and through a resistor 9'. The two high-voltage switches 3, 4 supply, at will, in synchronism with the printing operation, high-voltage pulses of a given duration having an amplitude $\varphi_{P_1}$ and $\varphi_{Z_1}$, respectively. If only one of the two switches is selected to supply a pulse, the printing electrode 1 receives a voltage pulse of a maximum value: $\varphi_{P_1}/2$, $\varphi_{Z_1}/2$ volt, respectively, which value is not sufficient to produce a spontaneous gas discharge. If, on the contrary, the two switches 3 and 4 are chosen simultaneously, that is to say changed over simultaneously to $\varphi_{P_1}$ and $\varphi_{Z_1}$, respectively, the printing electrode 1 receives a voltage pulse of maximum value:

$$\frac{\varphi_{P_1}+\varphi_{Z_1}}{2}\text{ volts}$$

The instantaneous value of this voltage pulse decreases by a time constant determined by the capacitors 8, 8' and the resistor 9', it is true, but for the initiation of the gas discharge this voltage is sufficient.

If the threshold value of the voltage for producing a spontaneous gas discharge exhibits only a small amount of stray, the requirements for the high-voltage switches 3 and 4 may be reduced by providing a potential deviating from zero, instead of zero potential, at the counter-electrode of FIGS. 1 to 3. This will be explained more fully with reference to an example. It may be assumed that the threshold value is 500 to 800 v., so that below 500 v. certainly no charge will be transferred, whereas in excess of 800 v. a transfer is certain to take place. Without bias voltage at the counter-electrode 5, $\varphi_{P_1}$ and $\varphi_{Z_1}$ of the arrangement shown in FIG. 1 had to be 800 v. each. With a bias voltage $\varphi_G$ of —200 v. and with $\varphi_{P_0}=\varphi_{Z_0}=0$ volt, $\varphi_{P_1}$ and $\varphi_{Z_1}$ require only 600 v. each. The voltage U between the printing electrode and the counter electrode is indicated for the various cases in the following tables. Table 1 shows the ratios without bias voltage at the counter-electrode 5 and Table 2 shows the situation with a bias voltage of —200 v.

TABLE 1

| $\varphi_P$ | $\varphi_Z$: 0 v. | $\varphi_Z$: 800 v. |
|---|---|---|
| 0 v. | 0 v. | 400 v. |
| 800 v. | 400 v. | 800 v. |

U=f ($\varphi_P$, $\varphi_Z$); $\varphi_G$=0 v.

TABLE 2

| $\varphi_P$ | $\varphi_Z$: 0 v. | $\varphi_Z$: 600 v. |
|---|---|---|
| 0 v. | 200 v. | 500 v. |
| 600 v. | 500 v. | 800 v. |

U=f ($\varphi_P$, $\varphi_Z$); $\varphi_G$=—200 v.

As a matter of course, other potential combinations may be used. The potential values indicated in the tables are, at any rate, not the only ones possible.

Figure 4:
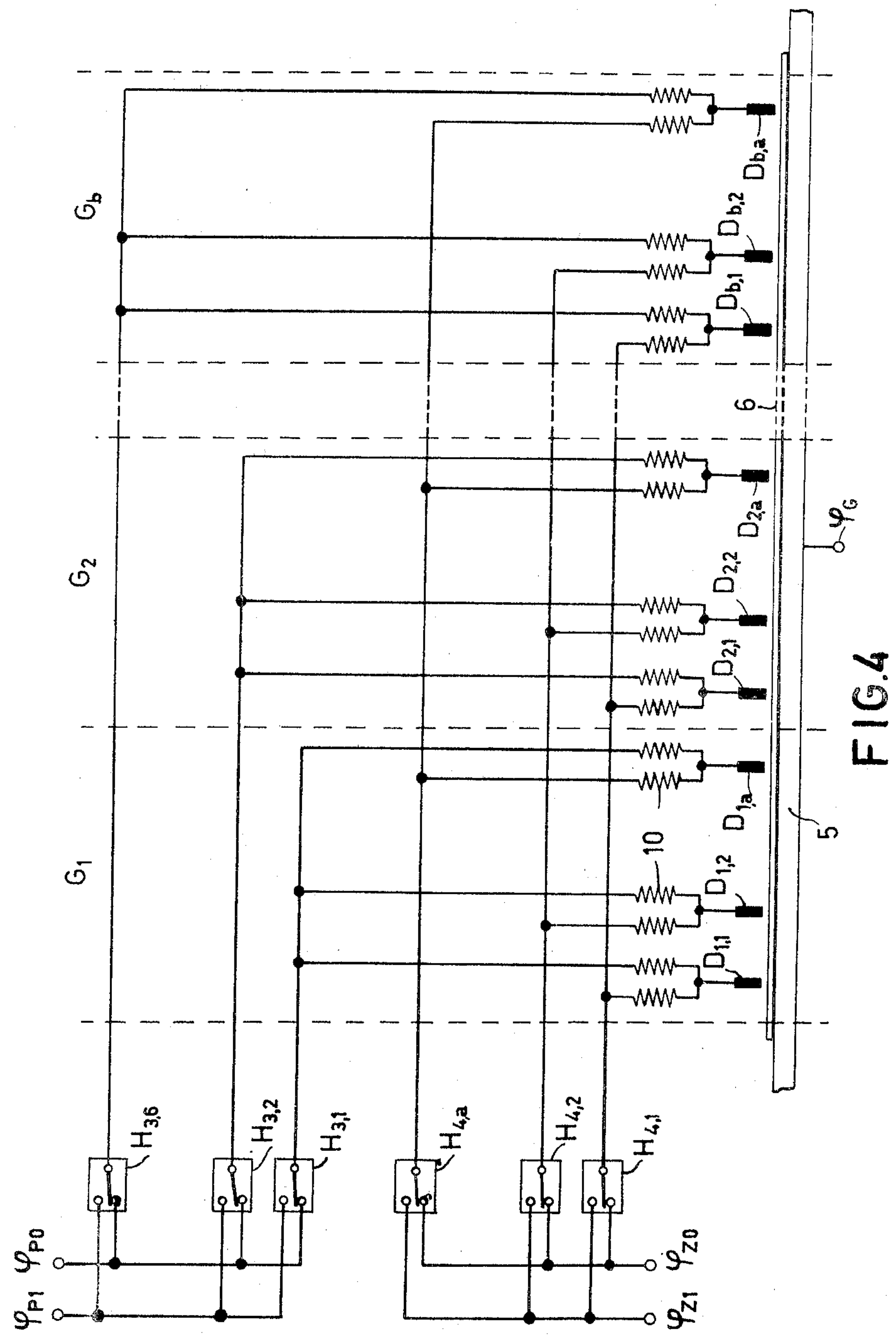
FIG. 4 illustrates the control of a number of printing electrodes.

An advantageous use of the method described above for controlling a single printing electrode is also obtained in the case of a great number of these printing electrodes united in a single printing head. If, for example, from $a\times b$ printing electrodes $b$ groups $G_1 \ldots G_b$ each comprising a group of $a$ printing electrodes can be formed, $a+b$ high-voltage switches are required. FIG. 4 shows the principle of such a device in which resistors 10 are used as dipoles connected between the high-voltage switches and the printing electrodes. Two groups of high-voltage switches $H_{3.1} \ldots H_{3.b}$ and $H_{4.1} \ldots H_{4.a}$ serve for exciting the printing electrodes $D_{1.1} \ldots D_{b.a}$ through the resistors 10. The simultaneous actuation of an arbitrary switch in each of the groups $H_3$ and $H_4$ results in an increase in the voltage between a single printing electrode, determined by the combination of the selected switches, and the counter-electrode 5 above the threshold value $U_i$ and hence a charge of the printing or recording surface 6 at the place corresponding to the printing electrode concerned.

What is claimed is:

1. An electrographic recording device comprising, a first electrode, a second electrode adjacent said first electrode to define a gap therewith adapted to receive a recording medium, a first source of voltage switchable between first and second voltage levels, a second source of voltage switchable between first and second voltage levels, a third source of fixed voltage, a resistor connected between said first electrode and said third voltage source, first and second diodes, means individually connecting said first and second diodes between said first electrode and said first and second voltage sources, respectively, so that the voltages at said first electrode exceeds the threshold level for initiating a discharge between said first electrode and the recording medium only if both of said first and second voltage sources are switched to deliver voltages of their respective second voltage levels.

2. A device as claimed in claim 1 wherein said first and second voltage sources deliver DC voltages of the same polarity at said second voltage level, said device further comprising a source of DC bias voltage of opposite polarity connected to said second electrode.

3. An electrographic recording device comprising a plurality of parallel arranged pin-shaped print electrodes, a second electrode adjacent and perpendicular to said print electrodes to define a plurality of gaps therewith adapted to receive a recording medium, first and second sources of voltage, a first plurality of switching elements, a first plurality of electric impedance elements, means connecting an input terminal of each of said switching elements to said first voltage source, means individually connecting said print electrodes to individual output terminals of said switching elements by means of individual ones of said impedance elements, a second switching element having an input terminal connected to said second voltage source, and means connecting said print electrodes to the output terminal of said second switching element by means of individual ones of said impedance elements.

4. A device as claimed in claim 3 wherein said impedance elements are ohmic resistors.

5. A device as claimed in claim 3 further comprising a source of fixed voltage, a second plurality of electric impedance elements, and means individually connecting said print electrodes to said source of fixed voltage by means of individual ones of said second impedance elements.

6. A device as claimed in claim 5 wherein said first plurality of impedance elements comprise diodes connected with the same polarity between said print electrodes and the output terminals of said first plurality of switching elements.

7. A device as claimed in claim 5 wherein said first plurality of impedance elements are capacitors.

8. A device as claimed in claim 3 further comprising means for applying a DC bias voltage to said second electrode.

9. An electrographic recording device comprising a plurality of parallel arranged pin-shaped print electrodes divided into N groups of M electrodes per group, a second electrode adjacent and perpendicular to said print electrodes to define a plurality of gaps therewith adapted to receive a recording medium, first and second sources of voltage, a first plurality of N switching elements each having an input terminal connected to said first voltage source, a first plurality of electric impedance elements, means individually connecting the print electrodes of the first group of electrodes to an output terminal of a first one of the switching elements by means of individual ones of said impedance elements, means individually connecting the print electrodes of a second group of electrodes to an output terminal of a second one of said switching elements by means of individual ones of said impedance elements, and so on up to and including the $N^{th}$ group of print electrodes and the $N^{th}$ switching element, a second plurality of M switching elements each having an input terminal connected to said second voltage source, a second plurality of electric impedance elements, means individually connecting the first print electrode of each of said groups of electrodes to an output terminal of a first switching element of said second plurality of switching elements by means of individual impedance elements of said second plurality of impedance elements, means individually connecting the second print electrode of each of said groups of electrodes to an output terminal of a second switching element of said second plurality of switching elements by means of individual impedance elements of said second plurality of impedance elements, and so on up to and including the $M^{th}$ electrode of each group and the $M^{th}$ switching element.

10. A device as claimed in claim 9 further comprising a source of fixed voltage, a third plurality of electric impedance elements, and means individually connecting said print electrodes to said source of fixed voltage by means of individual ones of said third impedance elements.

11. A device as claimed in claim 10 wherein said first and second pluralities of impedance elements comprise diodes and said third plurality of impedance elements comprise resistors.

12. A device as claimed in claim 10 wherein said first and second pluralities of impedance elements comprise capacitors and said third plurality of impedance elements comprise resistors.

13. A device as claimed in claim 9 further comprising a source of DC bias voltage connected to said second electrode of a magnitude that is below the electric discharge threshold level of said gaps.

14. An electrographic recording device comprising, a first electrode, a second electrode adjacent said first electrode to define a gap therewith adapted to receive a recording medium, a first source of voltage switchable between a first low level voltage and a second high voltage, a second source of voltage switchable between a first low level voltage and a second high level voltage, means connecting said second electrode to a fixed potential, means connecting a first resistor between said first electrode and the output of said first voltage source, means connecting a second resistor between said first electrode and the output of said second voltage source, said first and second resistors forming a voltage divider between said first and second voltage sources, the magnitude of said first and second voltage levels of said first and second voltage sources being chosen so that the voltage divider provides a voltage at said first electrode that is below the electric discharge threshold level of said gap if either of said voltage sources is switched to supply said first voltage level, and provides a voltage at said first electrode above said threshold level only when both of said voltage sources are switched to supply simultaneously said second voltage level.

15. A device as claimed in claim 14 wherein said first and second voltage sources deliver DC voltages of the same polarity at said second voltage level and said second electrode is connected to a fixed DC voltage of opposite polarity.

References Cited

UNITED STATES PATENTS

| | | | |
|---|---|---|---|
| 2,596,118 | 5/1952 | Bischoff | 346—74 |
| 3,095,569 | 6/1963 | Smith | 346—74 |
| 3,208,076 | 9/1965 | Mott | 346—74 |
| 3,254,346 | 5/1966 | Alexander | 346—74 |

TERRELL W. FEARS, Primary Examiner

G. M. HOFFMAN, Assistant Examiner

U.S. Cl. X.R.

250—49.5